US011139892B2

(12) United States Patent
Hamdy

(10) Patent No.: US 11,139,892 B2
(45) Date of Patent: Oct. 5, 2021

(54) SYSTEMS AND METHODS FOR A PASSIVE-ACTIVE DISTRIBUTED ANTENNA ARCHITECTURE

(71) Applicant: CommScope Technologies LLC, Hickory, NC (US)

(72) Inventor: Mohamed Nadder Hamdy, Dubai (AE)

(73) Assignee: CommScope Technologies LLC, Hickory, NC (US)

(*) Notice: Subject to any disclaimer, the term of this patent is extended or adjusted under 35 U.S.C. 154(b) by 89 days.

(21) Appl. No.: 16/554,468

(22) Filed: Aug. 28, 2019

(65) Prior Publication Data
US 2020/0106524 A1 Apr. 2, 2020

Related U.S. Application Data

(60) Provisional application No. 62/739,659, filed on Oct. 1, 2018.

(51) Int. Cl.
H04B 10/2575 (2013.01)
H04B 10/11 (2013.01)
H04B 7/0413 (2017.01)

(52) U.S. Cl.
CPC ..... *H04B 10/25753* (2013.01); *H04B 7/0413* (2013.01); *H04B 10/11* (2013.01)

(58) Field of Classification Search
CPC . H04B 10/25753; H04B 7/0413; H04B 10/11
See application file for complete search history.

(56) References Cited

U.S. PATENT DOCUMENTS 6,704,545 B1 3/2004 Wala
7,236,807 B1 6/2007 Shapira et al.
7,313,415 B2 12/2007 Wake et al.
7,469,105 B2 12/2008 Wake et al.
(Continued)

FOREIGN PATENT DOCUMENTS

WO 2017091117 A1 6/2017
WO 2018134773 A1 7/2018

OTHER PUBLICATIONS

International Searching Authority, "International Search Report and Written Opinion from PCT Application No. PCT/US2019/048606", from Foreign Counterpart to U.S. Appl. No. 16/554,468, dated Dec. 17, 2019, pp. 1-11, Published: WO.
(Continued)

Primary Examiner — Mina M Shalaby
(74) Attorney, Agent, or Firm — Fogg & Powers LLC

(57) ABSTRACT

Systems and methods for a passive-active distributed antenna architecture are provided. In one example embodiment, a distributed antenna architecture comprises: a passive wireless coverage system in communication with a base station; an active wireless coverage system in communication with the base station; a conductor network comprising a plurality of cables coupled to at least one splitter-combiner device; and a DC power injector circuit coupled to the conductor network; wherein the DC power injector circuit injects a DC power signal onto the conductor network; wherein the passive wireless coverage system communicates analog radio frequency (RF) signals with the base station over the conductor network.

21 Claims, 7 Drawing Sheets

(56) References Cited

U.S. PATENT DOCUMENTS

| | | | |
|---|---|---|---|
| 7,848,654 | B2 | 12/2010 | Sauer et al. |
| 8,208,414 | B2 | 6/2012 | Singh et al. |
| 8,310,963 | B2 | 11/2012 | Singh |
| 8,428,510 | B2 | 4/2013 | Stratford et al. |
| 8,626,238 | B2 | 1/2014 | Stratford et al. |
| 8,699,982 | B2 | 4/2014 | Singh |
| 8,929,740 | B2 | 1/2015 | Smith et al. |
| 9,306,682 | B2 | 4/2016 | Singh |
| 9,785,175 | B2 | 10/2017 | Hazani et al. |
| 2010/0208777 | A1* | 8/2010 | Ogaz .............. H04L 12/2838 375/219 |
| 2011/0268452 | A1 | 11/2011 | Beamon et al. |
| 2015/0002361 | A1* | 1/2015 | Pu .................. H01Q 5/50 343/853 |
| 2016/0294475 | A1 | 10/2016 | Chappell et al. |
| 2018/0031775 | A1 | 2/2018 | Gurreri et al. |
| 2018/0231731 | A1 | 8/2018 | Bakatsias et al. |
| 2019/0052340 | A1* | 2/2019 | Yuan ............... H04B 7/086 |
| 2019/0320464 | A1* | 10/2019 | Shen ............... H04W 74/004 |

OTHER PUBLICATIONS

Viavi, "DAS Deployment Overview Streamlined approaches for DAS deployments", Viavi, 2017, pp. 1-28, Viavi Solutions, Inc.
cableorganizer.com, "GEM Electronics IP POC Converters", downloaded May 18, 2018, p. 1, CableOrganizer.com.
Kathrein, "In-Building Wireless Solutions Passive Distributed Antenna Systems", Kathrein, May 3, 2016, pp. 1-12.
PROCOM, "Passive components for DAS solutions", PROCOM, Feb. 2015, pp. 1-16, antennaPRO Ltd.
Anritsu, "Understanding IBW Solutions", Anritsu, 2015, pp. 1-38, Anritsu Company.
AFL, "Wireless Solutions—Property Owner or Tenant", AFL, downloaded May 21, 2018, pp. 1-2.
Chamberlain et al., "Competitive Advantages of HFC Networks for Wireless Convergence", Fall Technical Forum, Oct. 17, 2017, pp. 1-12, SCTE-ISBE and NCTA.
Chamberlain et al., "Maintaining the Power Advantage in HFC Networks", Fall Technical Forum, Oct. 17, 2017, pp. 1-12, SCTE-ISBE and NCTA.
Chamberlain, "Reality Check: Competitive advantages of HFC networks for wireless convergence", RCRWirelessNews, Apr. 11, 2017, p. 1.
Greene, "Corning ONE Wireless Platform All-Optical Networking", Optical Communications, Jul. 2015, pp. 1-16, Corning.
Hariharan, "The Ins and Outs of DAS Powering", OSP Magazine, downloaded May 18, 2018, p. 1, Alpha Technologies.
Salas, "Remote DC Power through your Coax Cable", AD5X, Jan. 26, 2012, pp. 1-3.
Tarlazzi, "What Your DAS Needs to LTE", CommScope, Jun. 17, 2015, p. 1.

* cited by examiner

SYSTEMS AND METHODS FOR A PASSIVE-ACTIVE DISTRIBUTED ANTENNA ARCHITECTURE

CROSS-REFERENCE TO RELATED APPLICATIONS

This United States patent application claims priority to, and the benefit of, U.S. Provisional Patent Application No. 62/739,659, titled "SYSTEMS AND METHODS FOR A PASSIVE-ACTIVE DISTRIBUTED ANTENNA ARCHITECTURE" filed on Oct. 1, 2018, which is incorporated herein by reference in its entirety.

BACKGROUND

New building developers considering options for in-building telecommunications coverage essentially have two distinct distributed antenna system (DAS) technologies to choose from: passive DAS technologies and active DAS technologies.

Passive DAS distributes RF base transceiver station (BTS) radio signal inside buildings through branched RF paths that include a number of passive Radio Frequency (RF) splitters, coaxial cables and antennas. Designing a passive DAS can become increasingly challenging as the desired coverage areas increase in size, with long feeder runs from the BTS, and/or when the number of DAS infrastructure sharing operators increase. Active DAS was developed to overcome the challenges faced with passive DAS challenges as described above, namely large areas and infrastructures sharing.

Recent innovations in wireless telecommunications have led to a more widespread use of remote radio units (RRU). Unlike traditional BTS architectures, an RRU forms a component of a distributed BTS architecture in which the functions of the BTS are separated into two physically separate units—a baseband unit (BBU) and the remote radio unit. The BBU performs baseband processing for the particular air interface that is being used to wirelessly communicate over the RF channel. The RRU performs radio frequency processing to convert baseband data output from the BBU to radio frequency signals for radiating from one or more antennas coupled to the RRU and to produce baseband data for the BBU from radio frequency signals that are received at the RRU via one or more antennas.

The development of RRUs mitigated at least some of the drawbacks of passive DAS technologies. By placing multiple fiber connected RRUs in different parts across a building closer to the antennas, the long distance limitations were reduced. Passive DAS technologies also often appear to be a more appealing technology from both initial cost and maintenance overhead perspectives, where providing economical blanket coverage is the primary concern, and relatively low capacities and modest data speeds are considered an acceptable compromise. Such passive DAS technologies could also be considered sufficient to economically bring wireless connectivity to low traffic areas, such as lift lobbies, basements, parking garages, and similar locations that people tend to inhabit for only limited periods of time. On the other hand, passive DAS technologies are typically limited in their upgrade abilities to match wireless technologies continuous evolutions, such as higher Long Term Evolution (LTE) Multiple-Input Multiple-Output (MIMO) schemes and fifth generation (5G) millimeter wave (mmWave) radio technology, which typically require active DAS installations.

SUMMARY

The embodiments of the present disclosure provide methods and systems for a passive-active distributed antenna architecture and will be understood by reading and studying the following specification.

Systems and methods for a passive-active distributed antenna architecture are provided. In one example embodiment, a distributed antenna architecture comprises: a passive wireless coverage system in communication with a base station; an active wireless coverage system in communication with the base station; a conductor network comprising a plurality of cables coupled to at least one splitter-combiner device; and a DC power injector circuit coupled to the conductor network; wherein the DC power injector circuit injects a DC power signal onto the conductor network; wherein the passive wireless coverage system communicates analog radio frequency (RF) signals with the base station over the conductor network.

DRAWINGS

Embodiments of the present disclosure can be more easily understood and further advantages and uses thereof more readily apparent, when considered in view of the description of the preferred embodiments and the following figures in which.

In accordance with common practice, the various described features are not drawn to scale but are drawn to emphasize features relevant to the present disclosure. Reference characters denote like elements throughout figures and text.

DETAILED DESCRIPTION

In the following detailed description, reference is made to the accompanying drawings that form a part hereof, and in which is shown by way of specific illustrative embodiments in which the embodiments may be practiced. These embodiments are described in sufficient detail to enable those skilled in the art to practice the embodiments, and it is to be understood that other embodiments may be utilized and that logical, mechanical and electrical changes may be made without departing from the scope of the present disclosure. The following detailed description is, therefore, not to be taken in a limiting sense.

Embodiments of the present disclosure provide for distributed antenna architectures that may be initially deployed to function as passive antenna systems but are readily upgradable to include active access points capable of delivering more advanced connectivity solutions as the need for such solutions emerge. More specifically, a distributed antenna architecture is disclosed that comprises elements that support at least two distinct wireless coverage systems, a passive system and an active system. Generally, the fiber cable used to transport optical signals in an active DAS is not in itself expensive. For new DAS installation projects, a passive DAS wireless coverage system that uses a coaxial cable network is initially implemented at a significantly less expensive price point as compared to a fully active DAS. However, as part of the installation of a coaxial cable network, fiber cables can also be routed and installed to support a future active DAS coverage system. The coaxial cable network, in such an architecture, can be configured to serve two separate and distinct functions. With respect to the passive DAS wireless coverage system, the function of the coaxial cable is to provide RF transport between passive antennas and the RRU (or other source of radio frequency signals). With respect to the active DAS wireless coverage system, the same coaxial cable network can be used to distribute power to the active remote units of the active DAS wireless coverage system. A technical solution provided by this architecture is thus the utility of having an installed communications architecture that includes the ability to transition coverage from a passive DAS system over to an active DAS system in a phased manner without significant costs or efforts other than installing a new active remote unit to replace a previously installed passive antenna unit.

Figure 1:
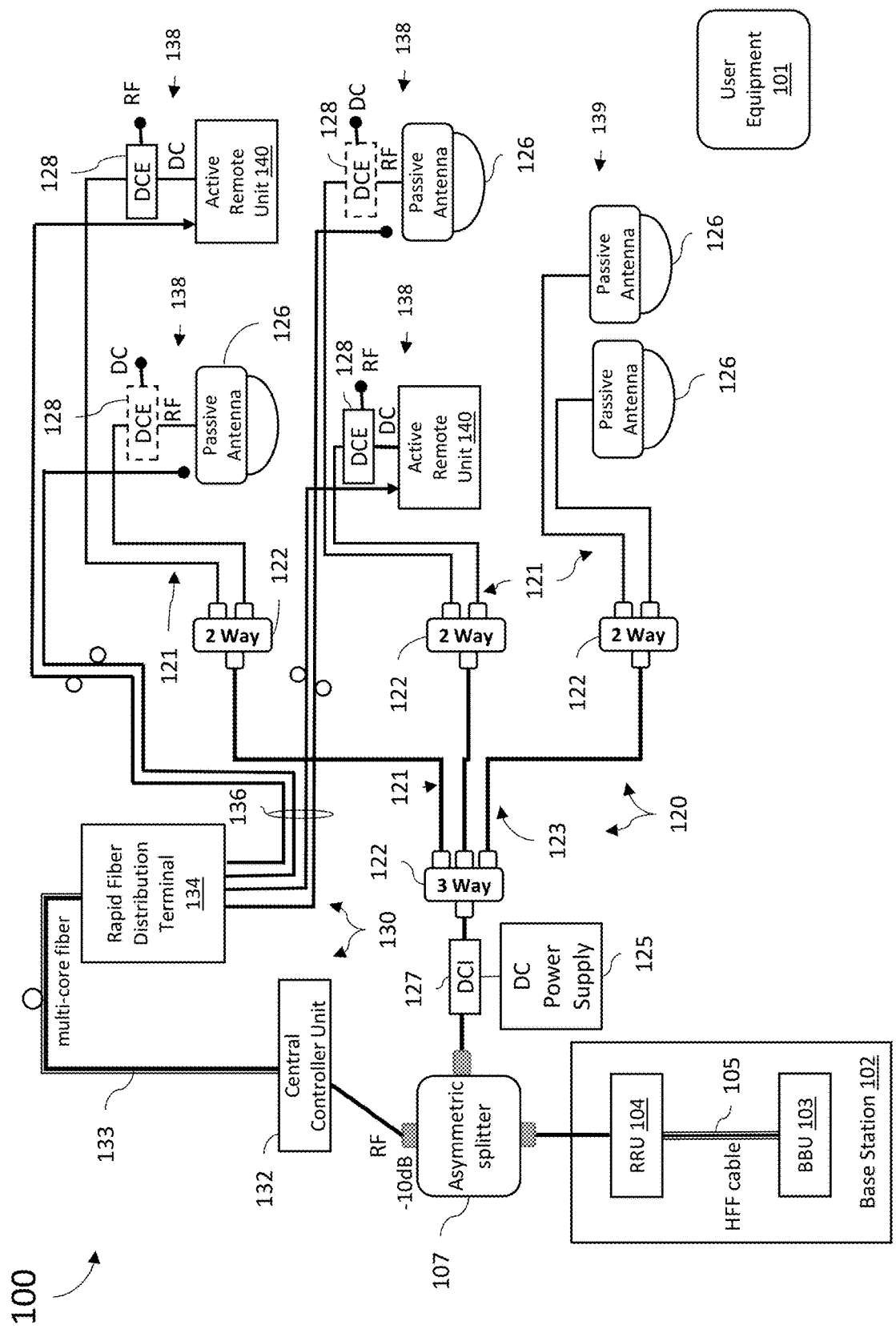
FIG. 1 is a diagram illustrating one embodiment of a distributed antenna architecture.

FIG. 1 is a diagram illustrating one embodiment of a distributed antenna architecture 100. As shown in FIG. 1, the distributed antenna architecture 100 includes both a passive wireless coverage system 120 (referred to herein as passive DAS 120) and an active wireless coverage system 130 (referred to herein as an active DAS 130), and a base station 102 that transports uplink and downlink RF communication signals with user equipment 101 via both the passive DAS 120 and the active DAS 130. In this particular embodiment, base station 102 is a distributed base station comprising an RRU 104 that exchanges synchronized serial streams of digital IQ samples with a Base Band Unit (BBU) 102 over a hybrid fiber feed (HFF) cable 105. In other embodiments, base station 102 may comprise a base transceiver station (BTS).

In the embodiment shown in FIG. 1, passive DAS 120 comprises one or more passive antenna devices 126 that are communicatively coupled to base station 102 over a conductor network 123 comprising electrical cables 121 and splitter-combiner devices 122 coupled together in a point-to-multipoint configuration. In some embodiments, the cables 121 comprise coaxial cables and network 123 comprises a coaxial cable network. It should be appreciated, however, that in other embodiments, electrical cables other than coaxial cable may be used (for example, twisted-pair cables may be used).

In the downlink direction, passive DAS 120 is configured to receive downlink radio frequency signals from base station 102. These signals may also be referred to as "base station downlink signals." Each base station downlink signal includes one or more radio frequency channels used for communicating in the downlink direction with user equipment 101 (such as tablets or cellular telephone, for example) over the relevant wireless air interface. Each splitter 122 receives the base station downlink signals as an input from a cable 121 and outputs the base station downlink signals on a plurality of outputs. In some segments of the passive DAS 120 conductor network 123, a downlink RF signal output from one splitter may be coupled to the input of another splitter 122 to form separate branches of the conductor network 123. Each passive antenna device 126 is coupled to the passive DAS 120 conductor network 123 to receive the base station downlink RF signals and broadcasts (radiate) the base station downlink signals as a wireless downlink RF signal to user equipment 101 within the coverage area of the passive DAS 120. In the uplink direction, passive DAS 120 is configured to receive respective uplink radio frequency signals from the user equipment 101 within the coverage area of the passive DAS 120, and transport those signals to the base station 102. Specifically, uplink RF signals transmitted by the user equipment 101 located within the coverage area of the passive DAS 120 are received by the passive antenna devices 126 and transmitted over a cable 121 onto the conductor network 123. In the uplink direction, the splitters 122 each function as RF signal combiners so that concurrently received uplink RF signals are passively summed (that is, superimposed) to form a composite uplink RF signal. Ultimately, a composite base station uplink signal output from the network 123 and provided to the base station 102. The base station uplink RF signal includes one or more of uplink radio frequency channels used for communicating with the user equipment 101 over the wireless air interface. In this way, the passive DAS 120 increases the coverage area available for both uplink and downlink communications between user equipment 101 and the base station 102 without the need for active signal distribution equipment, or any need for distributing power to the passive antenna device 126 which transmit and receive the wireless RF signals.

Active DAS 130 is also configured to receive the base station downlink RF signals from base station 102 (that is, the same base station downlink signals received by passive DAS 120) and use those base station downlink signals to generate an optical signal of the base station downlink signals, which is transmitted to user equipment 101 within the wider coverage area of the active DAS 130. In the uplink direction, active DAS 130 is configured to receive respective uplink RF signals from the user equipment 101 within the coverage area of the active DAS 130, and transport those signals to the base station 102. In the embodiment shown in FIG. 1, active DAS 130 may comprise a central controller unit 132, at least one fiber distribution terminal 134 (which may comprise a Rapid Fiber Distribution Terminal (RTD)), and one or more active remote units 140 (which may also be referred to as access points (APs)).

In one embodiment, the central controller unit 132 comprises a Central Access Node (CAN) that communicates uplink and downlink RF base station signals with the base station 102. Typically, each base station downlink signal is received as an analog radio frequency signal, though in some embodiments one or more of the base station signals are received in a digital form (for example, in a digital baseband form complying with the Common Public Radio Interface ("CPRI") protocol, Open Radio Equipment Interface ("ORP") protocol, the Open Base Station Standard Initiative ("OBSAI") protocol, or other protocol).

Figure 2:
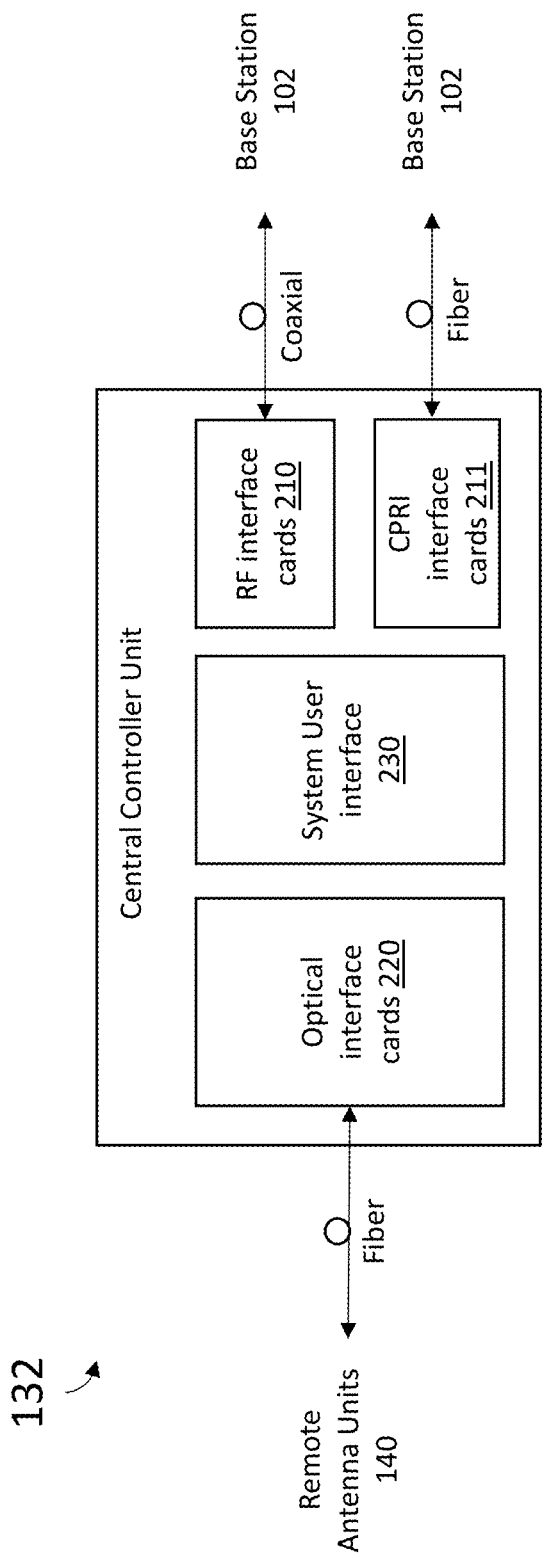
FIG. 2 is a block diagram illustrating one embodiment of a central controller unit.

FIG. 2 is a block diagram illustrating one embodiment of a central controller unit 132. In one embodiment, the central controller unit 132 comprises RF interface cards 210 or CPRI interface cards 211 interface with the base transceiver station radio 104 or baseband units 103 respectively. In this embodiment, one or more optical interface cards 220 relay the Uplink and Downlink BTS signals, over optical fiber, to and from the Remote Antenna Units 140 (for example, via a fiber network including a fiber distribution terminal 134). Typically, this involves, among other things, combining or summing uplink signals received from multiple active remote units 140 in order to produce the base station signal provided to base station 102. The base station uplink signal includes one or more of the uplink radio frequency channels used for communicating with the user equipment 101. In some embodiments, the central controller unit 132 comprises a system user interface 230, for configuration and fault management, and to implement one or more functions of the central controller unit 132 as described herein or other central controller unit functionalities. In some embodiments, the functions of the central controller unit 132 is implemented using a processor coupled to a memory.

The central controller unit 132 may be coupled to the fiber distribution terminal 134 using single-core or multi-core fiber (shown at 133), for example. From the fiber distribution terminal 134, optical fiber patch cables 136 are distributed to one or more antenna locations 138 where either an active remote unit 140 is deployed, or to where a passive antenna device 126 is deployed (as discussed in more detail below) but where upgradability to an active remote unit 140 may be desired in the future. As shown in FIG. 1 generally at 139, the optical fiber patch cables 136 are not necessarily installed everywhere a passive antenna device 126 is located. For example, there may be low traffic areas with minimal wireless connectivity needs where no future need for upgrading to an active remote unit 140 is contemplated.

The fiber distribution terminal 134 provides a housing for termination points where all optical fiber patch cables 136 distributed to the antenna locations 138 can be properly terminated and ready for activation once needed. That is, where an optical fiber patch cable 136 is distributed to an antenna location 138 where an active remote unit 140 is installed, the optical fiber patch cable 136 is "active" or "illuminated" by being patched within the fiber distribution terminal 134 to fiber 133 in order to communicate uplink and downlink optical communications traffic with the central controller unit 132. The active remote unit 140 at that antenna location 138 is coupled to the optical fiber patch cable 136, is configured to convert the downlink optical communications traffic into wireless downlink RF communication signals and is configured to convert the wireless uplink RF communication signals into uplink optical communications traffic. Where an optical fiber patch cable 136 is distributed to an antenna location 138 where no active remote unit 140 is installed, then that optical fiber patch 136 is "inactive" or "dark" and terminated within the fiber distribution terminal 134 as an inactive fiber that is ready for deployment once needed. Optical termination devices within the fiber distribution terminal 134 may include, but are not limited to, Multi-Fiber Push On (MPO) connectors, MTP multi-fiber connectors, optical fiber SC connector (Subscriber Connector), FC fiber connectors, LX.5 fiber connectors, LC connectors, other modular connectors and fiber optic connectors.

In one embodiment, the base station 102 is communicatively coupled to the passive DAS 120, and to the active DAS 130 via a splitter 107 that may comprise an asymmetric splitter as shown. For example, in one embodiment an asymmetric splitter comprises a 10 dB attenuated port that feeds the central controller unit 132 with an attenuated downlink base station signal from the base station 102. Utilization of such an asymmetric splitter ensures that coupling of the active DAS 130 to base station 102 will have minimal impact on the performance of the passive DAS 120 segment of the distributed antenna architecture 100.

Unlike the passive antenna devices 126 of the passive DAS 120, the active remote units 140 are active electronic devices that comprise active elements such as processors, amplifiers, and other electronic components and are configured to function as access points. With embodiments of the present disclosure, the same conductor network 123 that transports uplink and downlink RF signals within the passive DAS 120 is also utilized to deliver DC power to active components of the active DAS 130. That is, even though the fiber network is used for communicating optical transport signals within the active DAS 130, electrical DC power is provided to the active remote units 140 of the active DAS 140 via the same conductor network 123 that transports uplink and downlink RF signals within the passive DAS 120

As shown in FIG. 1, the distributed antenna architecture 100 further includes a DC power injector circuit 127. The DC power injector circuit 127 may be powered from a DC power supply 125 or other power source. DC power injector circuit 127 may be installed, for example, between the asymmetric splitter 107 and the conductor network 123, in order to inject DC power to the subsequent electrically conducing paths of the conductor network 123.

Figure 3:
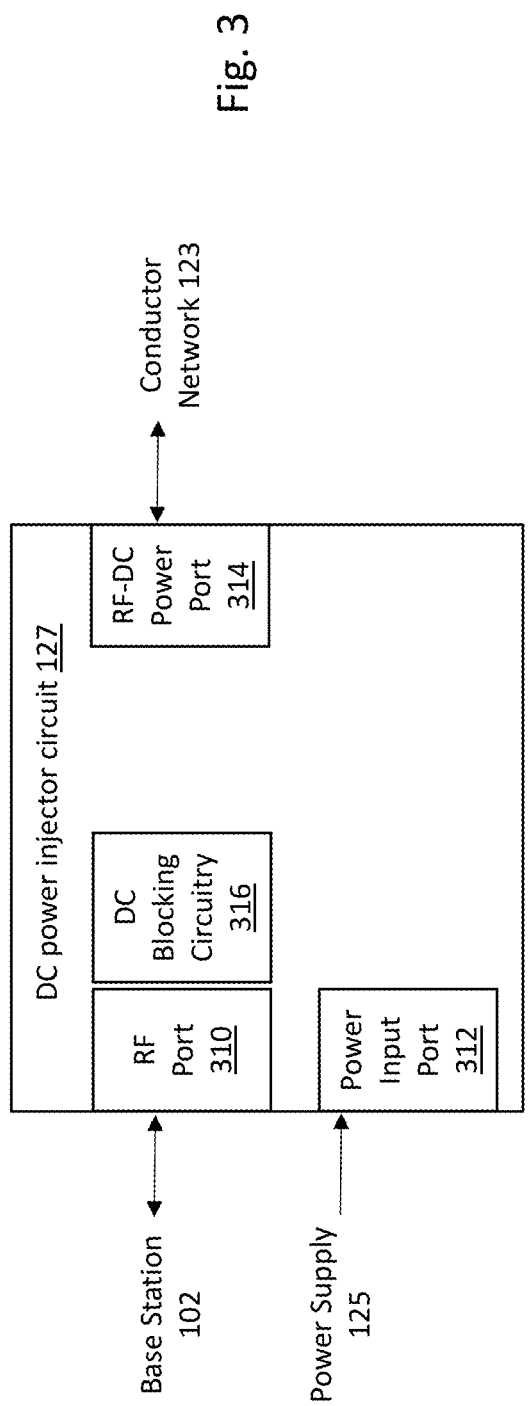
FIG. 3 is a diagram illustrating one embodiment of a DC power injector circuit.

FIG. 3 illustrates one embodiment of a DC power injector circuit 127. As shown in FIG. 3, in one embodiment, a DC power injector circuit 127 comprises an RF port 310, a power input port 312, and a combined RF-DC power port 314. In operation, DC power injection circuit 127 combines the downlink base station signal received from base station 102 via RF input port 210 and DC power received via power input port 312 into a single output from the combined RF-DC power port 314. In some embodiments, a DC blocking circuit (or filter) 316 is coupled to the RF input port 310. In the uplink direction, the DC blocking circuit 316 prevents any DC power applied to the conductor network 123 from back-feeding through the RF input port 310 onto the RF signal output of base station 102. In the downlink direction, in some embodiments, the DC blocking circuit 316 further blocks any DC signal component already present on the RF input port 210 from propagating through the DC power injection circuit 127. As such, the only DC component applied onto the conductor network 123 would be the power injected by the DC power injection circuit. In the uplink direction, uplink RF signals received at the RF-DC power port 314 are passed through to the RF port 310.

Moreover, with respect to DC power, each of the splitters 122 are configured with a DC by-pass so that DC power signals received at their downlink input port are not blocked but are instead passed-through in the downlink direction to cables 121.

The distributed antenna architecture 100 further includes one or more DC extractor circuits 128 that may be positioned at the distal ends of the conductor network 123 at the one or more antenna locations 138. This is done to extract DC power from the conductor network 123. In some implementations, one or more DC extractors 128 may be optionally pre-installed at antenna locations 138 where a passive antenna 126 is located and coupled to the conductor network 123. In such implementations, the DC extractors 128 function as a pass-through for RF signals between the passive antenna 126 and the conductor network 123. The DC signal is blocked from the passive antenna and might be used to power other low power devices, such as Wi-Fi extenders. In other implementations, antenna locations 138 where a passive antenna 126 is located may not include a DC extractor 128, in which case the passive antenna 126 may be directly coupled to the conductor network 123. In such implementations, the DC power extractor 128 may be installed at the time that antenna location 138 is upgraded with an active remote unit 140. In some embodiments, one or more elements of the DC power extractor 128 may be integrated within an active remote unit 140.

Figure 4:
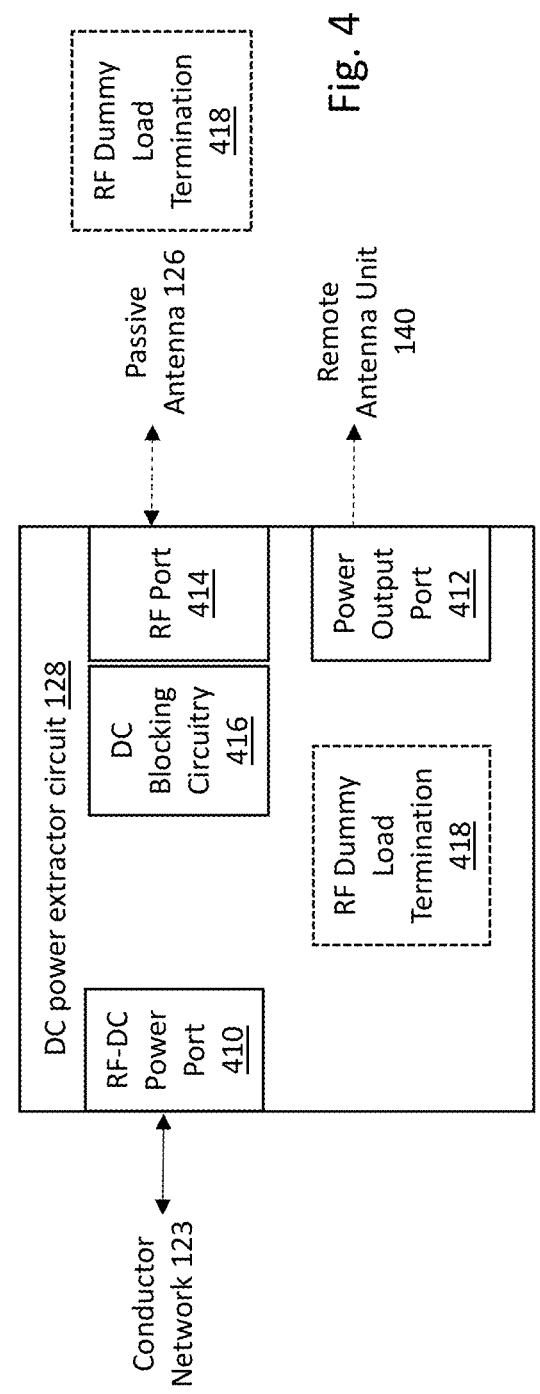
FIG. 4 is a diagram illustrating one embodiment of a DC power extractor circuit.

As shown in FIG. 4, in one embodiment, a DC power extractor circuit 128 comprises an RF-DC power port 410, a DC power output port 412, and an RF signal port 414. In some embodiments, the RF-DC power port 410 is coupled to an end of a cable 121 from conductor network 123 positioned at an antenna location 138. The RF-DC power port 410 receives, via the conductor network 123, the combined RF-DC power signal output from the DC power injector circuit 127 and separates the DC power from the RF signal. The DC power is provided to DC power output port 412 and the RF signal provided to RF signal port 414. In one embodiment, DC power extractor circuit 128 further include a DC blocking circuit 416 coupled to the RF signal port 414 to prevent the back feeding of any DC signal that may be present on the RF input port 410. In some embodiments, the DC extractor 128 may further comprise an internal or external dummy RF load termination 418 for terminating RF signals that are no longer terminated by the passive antenna 126 once the passive antenna 126 is replaced.

Figure 5:
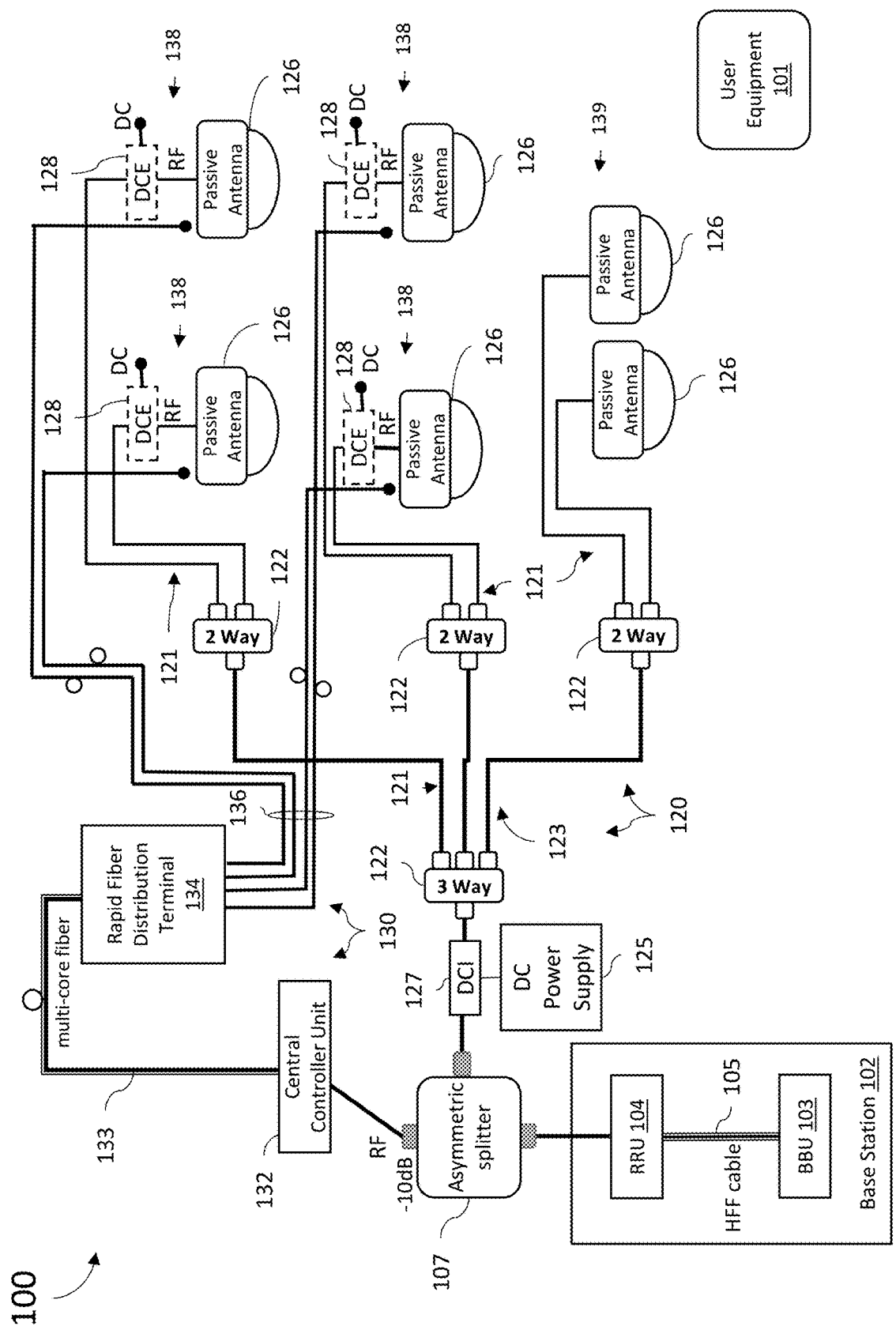
FIG. 5 is a diagram illustrating one embodiment of a distributed antenna architecture.

The distributed antenna architecture 100 at different times may exist in different phases or deployment configurations through the life of the system. For example, FIG. 5 illustrates what may be referred to as a phase I deployment or implementation of the distributed antenna architecture 100. That is, FIG. 5 may illustrate one initial deployment configuration where only the passive DAS 120 component of architecture 100 is operational because only passive antennas 126 are installed at the antenna locations 138. Phase I may represent a least-cost deployment where existing wireless connectivity needs can be met through operation of the passive DAS 120, but the architecture 100 has the utility of being immediately upgradable by installing one or more active remote units 140 at any of the antenna locations 138 which are upgrade-ready because both DC power and fiber connectivity are immediately available. The DC power injector 127 is positioned at the root of the conductor network 123 so that the conductor network 120 delivers DC power while also transporting RF signals between the passive antenna 126 and the Base Station 102. These antenna locations 138 are "ready for upgrade" to transition to an active DAS remote unit 140 because both the necessary power and RF fiber paths are already present. DC power extractors 128 may be optionally positioned at one or more of the antenna locations 138 or instead installed when an antenna location 138 is upgraded from a passive antenna 126 to an active remote antenna unit 140.

In contrast with FIG. 5, FIG. 1 illustrates what may be referred to as a phase II deployment or implementation of the distributed antenna architecture 100. In phase II, the distributed antenna architecture 100 has been at least partially configured to use one or more active remote units 140. One or more passive antenna 126 may remain in service, but a number of antenna locations 138 have been upgraded to active access points. The antenna locations 138 are upgraded to active access points by installing active remote units 140, as described above, operating in conjunction with the central controller unit 132. In this configuration, distributed antenna architecture 100 comprises two independent and distinct wireless coverage systems, the passive DAS 120 and the active DAS 130. Upgrades can be planned and coordinated to avoid signal delay conflicts between the passive and active systems. The passive DAS 120 communicates RF with the base station 102 over the conductor network 123. The active DAS 130 communicates with the same base station 102 via the fiber network and receives power to operate its active remote units 140 via the same conductor network 123. That is, the conductor network 123 serves a separate and distinct function for each of the two wireless coverage systems 120 and 130 within the distributed antenna architecture 100.

Figure 6:
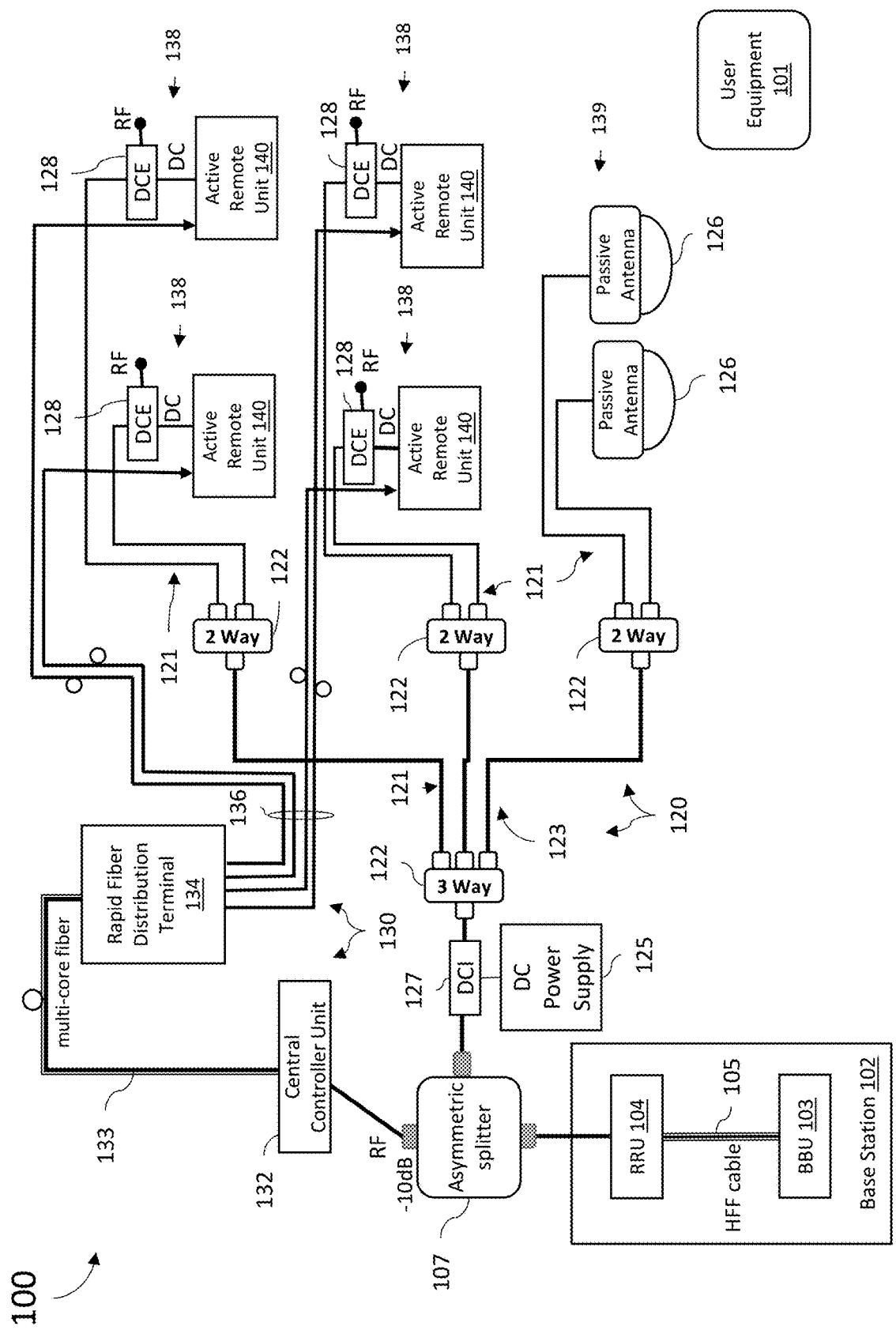
FIG. 6 is a diagram illustrating one embodiment of a distributed antenna architecture.

FIG. 6 illustrates a final phase deployment of the distributed antenna architecture 100, where each of the antenna locations 138 that can facilitate an active remote unit 140 have been upgraded to do so. In such a final phase deployment, active remote units 140 may still be used in conjunction with passive antenna 126 (as shown at 139), which may remain installed in low traffic areas with minimal wireless connectivity needs. As with the phase II deployment shown in FIG. 1, the conductor network 123 serves two separate and distinct functions within the distributed antenna architecture 100, which are to supply RF connectivity to the passive DAS 120 and to distribute DC power for the active DAS 130.

Figure 7:
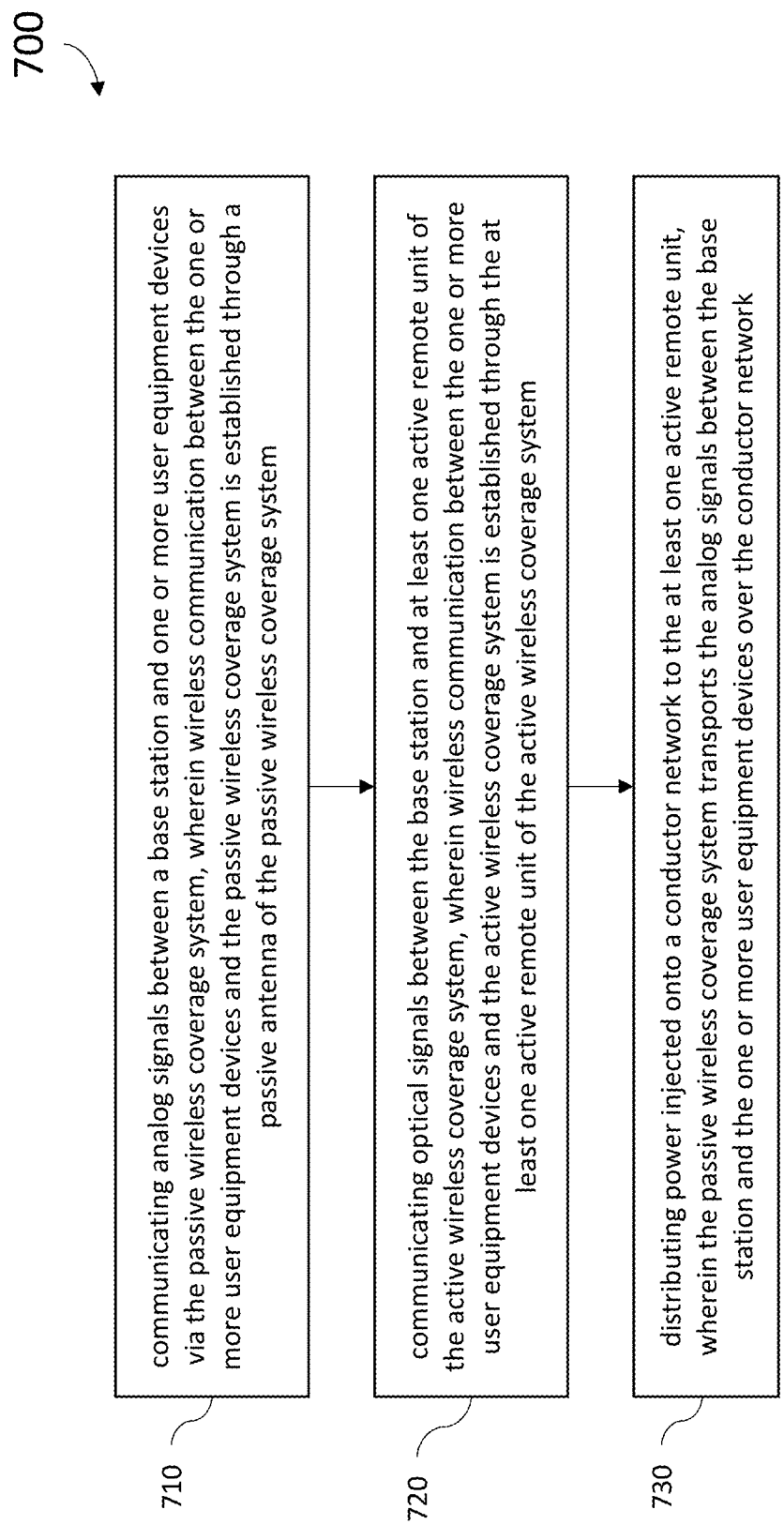
FIG. 7 is a flow chart illustrating one embodiment of a method for a distributed antenna architecture comprising both a passive wireless coverage system and an active wireless coverage system.

One example embodiment for operating the distributed antenna architecture 100 under a phase II deployment is illustrated by the method 700 shown in FIG. 7. That is, the method 700 defines a method for a distributed antenna architecture comprising both a passive wireless coverage system and an active wireless coverage system. It should be understood that the features and elements described herein with respect to the method shown in FIG. 7 and the accompanying disclosure may be used in conjunction with, in combination with, or substituted for elements of any of the other embodiments discussed herein, and vice versa. Further, it should be understood that the functions, structures and other description of elements associated with embodiments of FIG. 7 may apply to like named or described elements for any of the Figures and vice versa.

The method begins at 710 with communicating analog signals between a base station and one or more user equipment devices via the passive wireless coverage system. The wireless communication between the one or more user equipment devices and the passive wireless coverage system is established through a passive antenna of the passive wireless coverage system. The method 700 also includes, as shown at 720, communicating optical signals between the base station and at least one active remote unit of the active wireless coverage system. Here, wireless communication between the one or more user equipment devices and the active wireless coverage system is established through the at least one active remote unit of the active wireless coverage system. As described above, the conductor network 123 serves two separate and distinct functions within the distributed antenna architecture 100, which are to supply RF connectivity to the passive DAS 120 and to distribute DC power for the active DAS 130. Accordingly, the method 700 further includes distributing power injected onto a conductor network to the at least one active remote unit, wherein the passive wireless coverage system transports the analog signals between the base station and the one or more user equipment devices over the conductor network.

Figure 8:
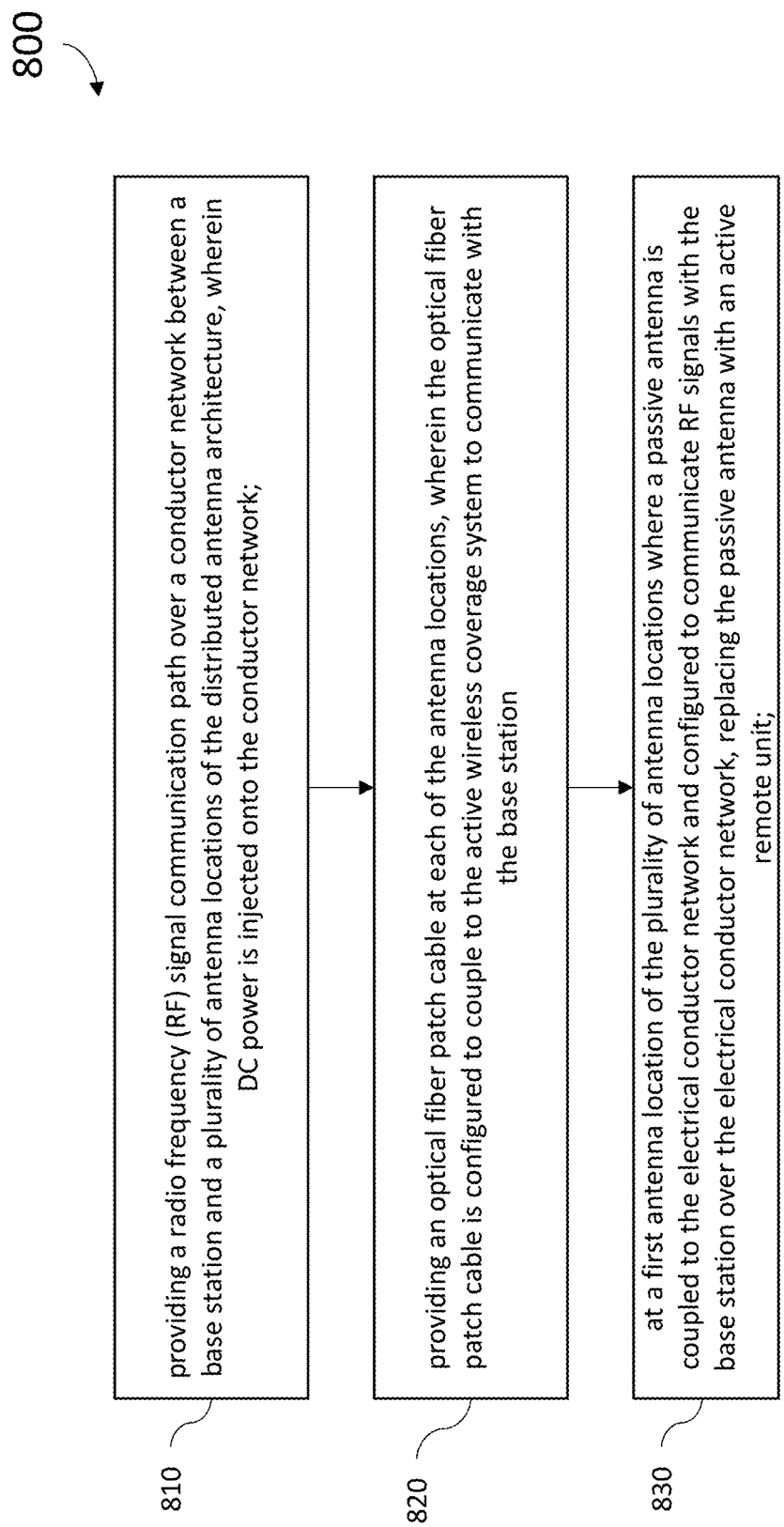
FIG. 8 is a flow chart illustrating one embodiment of a method for an upgradable distributed antenna architecture comprising a passive wireless coverage system and an active wireless coverage system.

As described above, the distributed antenna architecture 100 disclosed herein has the utility of being immediately upgradable by installing one or more active remote units 140 at any of the antenna locations 138 which are upgrade-ready because both DC power and fiber connectivity are immediately available. A corresponding method for an upgradable distributed antenna architecture comprising a passive wireless coverage system and an active wireless coverage system is illustrated by the method 800 shown in FIG. 8. It should be understood that the features and elements described herein with respect to the method shown in FIG. 8 and the accompanying disclosure may be used in conjunction with, in combination with, or substituted for elements of any of the other embodiments discussed herein, and vice versa. Further, it should be understood that the functions, structures and other description of elements associated with embodiments of FIG. 8 may apply to like named or described elements for any of the Figures and vice versa.

The method 800 begins at 810 with providing a radio frequency (RF) signal communication path over a conductor network between a base station and a plurality of antenna locations of the distributed antenna architecture, wherein DC power is injected onto the conductor network. The method 800 further includes at 820 providing an optical fiber patch cable at each of the antenna locations. The optical fiber patch cable is configured to couple to the active wireless coverage system to communicate with the base station. As shown at 830, at a first antenna location of the plurality of antenna locations where a passive antenna is coupled to the electrical conductor network and configured to communicate RF signals with the base station over the electrical conductor network, the method 800 includes replacing the passive antenna with an active remote unit. Here, replacing the passive antenna with an active remote unit comprises coupling the active remote unit to the base station by connecting the optical fiber patch cable at the first antenna location to the active remote unit and extracting DC power from the electrical conductor network to power the active remote unit.

EXAMPLE EMBODIMENTS

Example 1 includes a distributed antenna architecture, the architecture comprising: a passive wireless coverage system in communication with a base station; an active wireless coverage system in communication with the base station; a conductor network comprising a plurality of cables coupled to at least one splitter-combiner device; and a DC power injector circuit coupled to the conductor network; wherein the DC power injector circuit injects a DC power signal onto the conductor network; wherein the passive wireless coverage system communicates analog radio frequency (RF) signals with the base station over the conductor network.

Example 2 includes the architecture of example 1, further comprising an asymmetrical splitter; wherein the passive wireless coverage system is coupled to the base station by a first port of the asymmetrical splitter; and wherein the active wireless coverage system is coupled to the base station by a second port of the asymmetrical splitter.

Example 3 includes the architecture of any of examples 1-2, wherein the base station comprises a baseband unit (BBU) coupled to a remote radio units (RRU).

Example 4 includes the architecture of any of examples 1-3, wherein the conductor network comprises a plurality of cables coupled to at least one splitter-combiner device.

Example 5 includes the architecture of example 4, wherein the plurality of cables comprise coaxial cables.

Example 6 includes the architecture of any of examples 4-5, wherein the at least one splitter-combiner device is configured to pass the DC power signal in the downlink direction.

Example 7 includes the architecture of any of examples 1-6, wherein the passive wireless coverage system comprises a plurality of passive antennas, each of the plurality of passive antennas coupled to the conductor network at a respective antenna location of the distributed antenna architecture, wherein each of the plurality of passive antenna wirelessly transmits base station downlinks signals received from the base station via the conductor network; and wherein each of the plurality of passive antenna wirelessly transmits uplink RF signals to the base station via the conductor network.

Example 8 includes the architecture of example 7, wherein the plurality of passive antenna is coupled to the base station in a point-to-multipoint configuration by the conductor network.

Example 9 includes the architecture of any of examples 1-8, wherein the active wireless coverage system comprises: a central controller unit; and at least one active remote unit located at a first antenna location of the distributed antenna architecture, wherein the central controller unit is communicatively coupled to the base station and coupled to at least one active remote unit by an optical fiber connection, wherein the at least one active remote unit communicates uplink and downlink optical communications traffic with the central controller unit over the optical fiber connection; wherein the at least one active remote unit is coupled to the conductor network at the first antenna location, wherein the at least one active remote unit is powered by DC power from the conductor network injected by the DC power injector circuit.

Example 10 includes the architecture of example 9, the active wireless coverage system further comprising at least one fiber distribution terminal, wherein the at least one active remote unit is coupled to the at least one fiber distribution terminal by the optical fiber connection.

Example 11 includes the architecture of any of examples 9-10, wherein the central controller unit comprises a Central Access Node (CAN) configured to distribute base station downlink signals to the at least one fiber distribution terminal.

Example 12 includes the architecture of any of examples 1-11, wherein the DC power injector circuit comprises: an RF port configured to communicatively couple to the base station; a power input port; and an RF signal-DC power port; wherein the DC power injector combines a downlink base station signal received from the RF input port with DC power received from the power input port to produce a combined RF signal-DC power output from the combined RF-DC power port.

Example 13 includes the architecture of example 12, wherein the DC power injector circuit comprises: a DC blocking circuit coupled to the RF port; wherein the DC blocking circuit blocks back feeding of DC power from the conductor network to the RF port.

Example 14 includes the architecture of any of examples 12-13, wherein the DC power injector circuit is configured to block DC signal components received at the RF port.

Example 15 includes the architecture of any of examples 1-14, further comprising: at least one DC extractor circuit located at a first antenna location of the distributed antenna architecture, wherein the at least one DC extractor circuit comprises: an RF signal-DC power port coupled to the conductor network and configured to receive a combined RF signal-DC power signal from the conductor network; an RF port; and a power output port; wherein the DC extractor circuit is configured to extract DC power from combined RF signal-DC power signal to provide DC power at the power output port and a base station downlink signal at the RF port.

Example 16 includes the architecture of example 15, wherein at least one active remote unit of the active wireless coverage system is coupled to the power output port of the DC extractor circuit, wherein the at least one active remote unit is powered by DC power injected by the DC power injector circuit from the power output port.

Example 17 includes the architecture of example 16, wherein the DC extractor circuit further comprises: a dummy RF load termination device for terminating RF signals at the RF port.

Example 18 includes the architecture of any of examples 15-17, wherein at least one passive antenna of the passive wireless coverage system is coupled to the RF port of the DC extractor circuit, where the passive wireless coverage system is communicatively coupled to the base station through the RF port.

Example 19 includes the architecture of any of examples 15-18, wherein the DC extractor circuit further comprises: a DC blocking circuit coupled to the RF port; wherein the DC blocking circuit blocks back feeding of DC power onto the conductor network.

Example 20 includes a method for a distributed antenna architecture comprising a passive wireless coverage system and an active wireless coverage system, the method comprising: communicating analog signals between a base station and one or more user equipment devices via the passive wireless coverage system, wherein wireless communication between the one or more user equipment devices and the passive wireless coverage system is established through a passive antenna of the passive wireless coverage system; communicating optical signals between the base station and at least one active remote unit of the active wireless coverage system, wherein wireless communication between the one or more user equipment devices and the active wireless coverage system is established through the at least one active remote unit of the active wireless coverage system; and distributing power injected onto a conductor network to the at least one active remote unit, wherein the passive wireless coverage system transports the analog signals between the base station and the one or more user equipment devices over the conductor network.

Example 21 includes the method of example 20, wherein the base station comprises a baseband unit (BBU) coupled to a remote radio units (RRU).

Example 22 includes the method of any of examples 20-21, wherein the passive wireless coverage system comprises a plurality of passive antennas, each of the plurality of passive antennas coupled to the conductor network at a respective antenna location of the distributed antenna architecture, wherein each of the plurality of passive antenna wirelessly transmits base station downlinks signals received from the base station via the conductor network; and wherein each of the plurality of passive antenna wirelessly transmits uplink RF signals to the base station via the conductor network.

Example 23 includes the method of any of examples 20-22, wherein the active wireless coverage system comprises: a central controller unit; and at least one active remote unit located at a first antenna location of the distributed antenna architecture, wherein the central controller unit is communicatively coupled to the base station and coupled to at least one active remote unit by an optical fiber connection, wherein the at least one active remote unit communicates uplink and downlink optical communications traffic with the central controller unit over the optical fiber connection; wherein the at least one active remote unit is coupled to the conductor network at the first antenna location, wherein the at least one active remote unit is powered by DC power from the conductor network injected by the DC power injector circuit.

Example 24 includes a method for an upgradable distributed antenna architecture comprising a passive wireless coverage system and an active wireless coverage system, the method comprising: providing a radio frequency (RF) signal communication path over a conductor network between a base station and a plurality of antenna locations of the distributed antenna architecture, wherein DC power is injected onto the conductor network; providing an optical fiber patch cable at each of the antenna locations, wherein the optical fiber patch cable is configured to couple to the active wireless coverage system to communicate with the base station; and at a first antenna location of the plurality of antenna locations where a passive antenna is coupled to the electrical conductor network and configured to communicate RF signals with the base station over the electrical conductor network, replacing the passive antenna with an active remote unit; wherein replacing the passive antenna with an active remote unit comprises coupling the active remote unit to the base station by connecting the optical fiber patch cable at the first antenna location to the active remote unit and extracting DC power from the electrical conductor network to power the active remote unit.

In various alternative embodiments, system and/or device elements, method steps, or example implementations described throughout this disclosure (such as any of the RRU, BBU, central controller unit, active remote units, controllers, interfaces, or sub-parts of any thereof, for example) may be implemented at least in part using one or more computer systems, field programmable gate arrays (FPGAs), or similar devices comprising a processor coupled to a memory and executing code to realize those elements, processes, or examples, said code stored on a non-transient hardware data storage device. Therefore, other embodiments of the present disclosure may include elements comprising program instructions resident on computer readable media which when implemented by such computer systems, enable them to implement the embodiments described herein. As used herein, the term "computer readable media" refers to tangible memory storage devices having non-transient physical forms. Such non-transient physical forms may include computer memory devices, such as but not limited to punch cards, magnetic disk or tape, any optical data storage system, flash read only memory (ROM), non-volatile ROM, programmable ROM (PROM), erasable-programmable ROM (E-PROM), random access memory (RAM), or any other form of permanent, semi-permanent, or temporary memory storage system or device having a physical, tangible form. Program instructions include, but are not limited to, computer-executable instructions executed by computer system processors and hardware description languages such as Very High-Speed Integrated Circuit (VHSIC) Hardware Description Language (VHDL).

As used herein, terms such as "controller", "active remote unit", "master unit", "host unit", "port", "interface", "remote radio unit", "baseband unit", "circuit" or "circuitry", each refer to non-generic device elements that would be recognized and understood by those of skill in the art and are not used herein as nonce words or nonce terms for the purpose of invoking 35 USC 112(f).

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the presented embodiments. Therefore, it is manifestly intended that embodiments be limited only by the claims and the equivalents thereof.

What is claimed is:

1. A distributed antenna architecture, the architecture comprising:
   a passive wireless coverage system in communication with a base station;
   an active wireless coverage system in communication with the base station;
   a conductor network comprising a plurality of cables coupled to at least one splitter-combiner device; and
   a DC power injector circuit coupled to the conductor network;
   wherein the DC power injector circuit injects a DC power signal onto the conductor network;
   wherein the passive wireless coverage system communicates analog radio frequency (RF) signals with the base station over the conductor network,
   wherein the passive wireless coverage system comprises a plurality of passive antennas, each of the plurality of passive antennas coupled to the conductor network at a respective antenna location of the distributed antenna architecture, wherein each of the plurality of passive antenna wirelessly transmits base station downlinks signals received from the base station via the conductor network; and
   wherein each of the plurality of passive antenna wirelessly transmits uplink RF signals to the base station via the conductor network.

2. The architecture of claim 1, further comprising an asymmetrical splitter;
   wherein the passive wireless coverage system is coupled to the base station by a first port of the asymmetrical splitter; and
   wherein the active wireless coverage system is coupled to the base station by a second port of the asymmetrical splitter.

3. The architecture of claim 1, wherein the base station comprises a baseband unit (BBU) coupled to a remote radio units (RRU).

4. The architecture of claim 1, wherein the conductor network comprises a plurality of cables coupled to at least one splitter-combiner device.

5. The architecture of claim 4, wherein the plurality of cables comprise coaxial cables.

6. The architecture of claim 4, wherein the at least one splitter-combiner device is configured to pass the DC power signal in the downlink direction.

7. The architecture of claim 1, wherein the plurality of passive antennas is coupled to the base station in a point-to-multipoint configuration by the conductor network.

8. A distributed antenna architecture, the architecture comprising:
   a passive wireless coverage system in communication with a base station;
   an active wireless coverage system in communication with the base station;
   a conductor network comprising a plurality of cables coupled to at least one splitter-combiner device; and
   a DC power injector circuit coupled to the conductor network;
   wherein the DC power injector circuit injects a DC power signal onto the conductor network;
   wherein the passive wireless coverage system communicates analog radio frequency (RF) signals with the base station over the conductor network;
   wherein the active wireless coverage system comprises:
   a central controller unit; and
   at least one active remote unit located at a first antenna location of the distributed antenna architecture, wherein the central controller unit is communicatively coupled to the base station and coupled to at least one active remote unit by an optical fiber connection, wherein the at least one active remote unit communicates uplink and downlink optical communications traffic with the central controller unit over the optical fiber connection;
   wherein the at least one active remote unit is coupled to the conductor network at the first antenna location, wherein the at least one active remote unit is powered by DC power from the conductor network injected by the DC power injector circuit.

9. The architecture of claim 8, the active wireless coverage system further comprising at least one fiber distribution terminal, wherein the at least one active remote unit is coupled to the at least one fiber distribution terminal by the optical fiber connection.

10. The architecture of claim 8, wherein the central controller unit comprises a Central Access Node (CAN) configured to distribute base station downlink signals to the at least one fiber distribution terminal.

11. A distributed antenna architecture, the architecture comprising:
    a passive wireless coverage system in communication with a base station;
    an active wireless coverage system in communication with the base station;
    a conductor network comprising a plurality of cables coupled to at least one splitter-combiner device; and
    a DC power injector circuit coupled to the conductor network;
    wherein the DC power injector circuit injects a DC power signal onto the conductor network;
    wherein the passive wireless coverage system communicates analog radio frequency (RF) signals with the base station over the conductor network;
    wherein the DC power injector circuit comprises:
    an RF port configured to communicatively couple to the base station;
    a power input port; and
    an RF signal-DC power port;
    wherein the DC power injector combines a downlink base station signal received from the RF input port with DC power received from the power input port to produce a combined RF signal-DC power output from the combined RF-DC power port.

12. The architecture of claim 11, wherein the DC power injector circuit comprises:
    a DC blocking circuit coupled to the RF port;
    wherein the DC blocking circuit blocks back feeding of DC power from the conductor network to the RF port.

13. The architecture of claim 11, wherein the DC power injector circuit is configured to block DC signal components received at the RF port.

14. A distributed antenna architecture, the architecture comprising:
    a passive wireless coverage system in communication with a base station;
    an active wireless coverage system in communication with the base station;

a conductor network comprising a plurality of cables coupled to at least one splitter-combiner device; and a DC power injector circuit coupled to the conductor network;

at least one DC extractor circuit located at a first antenna location of the distributed antenna architecture, wherein the at least one DC extractor circuit comprises:

an RF signal-DC power port coupled to the conductor network and configured to receive a combined RF signal-DC power signal from the conductor network;

an RF port; and a power output port;

wherein the DC power injector circuit injects a DC power signal onto the conductor network;

wherein the passive wireless coverage system communicates analog radio frequency (RF) signals with the base station over the conductor network;

wherein the DC extractor circuit is configured to extract DC power from combined RF signal-DC power signal to provide DC power at the power output port and a base station downlink signal at the RF port.

15. The architecture of claim 14, wherein at least one active remote unit of the active wireless coverage system is coupled to the power output port of the DC extractor circuit, wherein the at least one active remote unit is powered by DC power injected by the DC power injector circuit from the power output port.

16. The architecture of claim 15, wherein the DC extractor circuit further comprises: a dummy RF load termination device for terminating RF signals at the RF port.

17. The architecture of claim 14, wherein at least one passive antenna of the passive wireless coverage system is coupled to the RF port of the DC extractor circuit, where the passive wireless coverage system is communicatively coupled to the base station through the RF port.

18. The architecture of claim 14, wherein the DC extractor circuit further comprises:

a DC blocking circuit coupled to the RF port;

wherein the DC blocking circuit blocks back feeding of DC power onto the conductor network.

19. A method for a distributed antenna architecture comprising a passive wireless coverage system and an active wireless coverage system, the method comprising:

communicating analog signals between a base station and one or more user equipment devices via the passive wireless coverage system, wherein wireless communication between the one or more user equipment devices and the passive wireless coverage system is established through a passive antenna of the passive wireless coverage system;

communicating optical signals between the base station and at least one active remote unit of the active wireless coverage system, wherein wireless communication between the one or more user equipment devices and the active wireless coverage system is established through the at least one active remote unit of the active wireless coverage system; and distributing power injected onto a conductor network to the at least one active remote unit, wherein the passive wireless coverage system transports the analog signals between the base station and the one or more user equipment devices over the conductor network;

wherein the passive wireless coverage system comprises a plurality of passive antennas, each of the plurality of passive antennas coupled to the conductor network at a respective antenna location of the distributed antenna architecture, wherein each of the plurality of passive antenna wirelessly transmits base station downlinks signals received from the base station via the conductor network; and wherein each of the plurality of passive antenna wirelessly transmits uplink RF signals to the base station via the conductor network.

20. The method of claim 19, wherein the base station comprises a baseband unit (BBU) coupled to a remote radio units (RRU).

21. A method for a distributed antenna architecture comprising a passive wireless coverage system and an active wireless coverage system, the method comprising:

communicating analog signals between a base station and one or more user equipment devices via the passive wireless coverage system, wherein wireless communication between the one or more user equipment devices and the passive wireless coverage system is established through a passive antenna of the passive wireless coverage system;

communicating optical signals between the base station and at least one active remote unit of the active wireless coverage system, wherein wireless communication between the one or more user equipment devices and the active wireless coverage system is established through the at least one active remote unit of the active wireless coverage system; and distributing power injected onto a conductor network to the at least one active remote unit, wherein the passive wireless coverage system transports the analog signals between the base station and the one or more user equipment devices over the conductor network;

wherein the active wireless coverage system comprises:

a central controller unit; and at least one active remote unit located at a first antenna location of the distributed antenna architecture, wherein the central controller unit is communicatively coupled to the base station and coupled to at least one active remote unit by an optical fiber connection, wherein the at least one active remote unit communicates uplink and downlink optical communications traffic with the central controller unit over the optical fiber connection;

wherein the at least one active remote unit is coupled to the conductor network at the first antenna location, wherein the at least one active remote unit is powered by DC power from the conductor network injected by the DC power injector circuit.

\* \* \* \* \*